(12) United States Patent
Tateishi et al.

(10) Patent No.: US 7,471,609 B2
(45) Date of Patent: Dec. 30, 2008

(54) HOLOGRAM REPRODUCTION APPARATUS AND REPRODUCTION METHOD

(75) Inventors: Kiyoshi Tateishi, Tsurugashima (JP); Michikazu Hashimoto, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 721 days.

(21) Appl. No.: 11/075,764

(22) Filed: Mar. 10, 2005

(65) Prior Publication Data

US 2006/0077852 A1 Apr. 13, 2006

(30) Foreign Application Priority Data

Mar. 10, 2004 (JP) ............... 2004-066961

(51) Int. Cl.
*G11B 7/00* (2006.01)

(52) U.S. Cl. ...................... 369/103; 369/126

(58) Field of Classification Search ............ 369/103
See application file for complete search history.

(56) References Cited

U.S. PATENT DOCUMENTS

| | | | |
|---|---|---|---|
| 6,445,470 B1 * | 9/2002 | Jenkins et al. | 359/11 |
| 6,486,982 B1 * | 11/2002 | Davis | 359/9 |
| 7,236,441 B2 * | 6/2007 | Tanaka et al. | 369/103 |
| 7,248,389 B2 * | 7/2007 | Toishi | 359/22 |
| 7,262,892 B1 * | 8/2007 | Yasuda et al. | 359/29 |
| 7,321,541 B2 * | 1/2008 | Horimai | 369/103 |
| 2005/0147013 A1 * | 7/2005 | Tateishi et al. | 369/103 |
| 2006/0033987 A1 * | 2/2006 | Stelzer et al. | 359/385 |
| 2007/0115789 A1 * | 5/2007 | Liedenbaum | 369/103 |
| 2007/0121185 A1 * | 5/2007 | Tsukagoshi et al. | 359/22 |

FOREIGN PATENT DOCUMENTS

| | | |
|---|---|---|
| JP | 9-288309 | 11/1997 |
| JP | 11-16374 | 1/1999 |

* cited by examiner

*Primary Examiner*—Tan X Dinh
*Assistant Examiner*—Van N Chow
(74) *Attorney, Agent, or Firm*—Nixon & Vanderhye, PC

(57) ABSTRACT

A hologram reproduction apparatus includes a light-receiving unit such as a two-dimensional sensor which obtains two-dimensionally modulated image data, and an A/D converter which A/D-converts analog data obtained by the light-receiving unit into digital data. In addition, the hologram reproduction apparatus detects a number of pixels having a digital value larger than a first defined value in the A/D-converted image data for one page, by a first pixel number detecting unit. The hologram reproduction apparatus controls a magnitude value of the image data at the time of the A/D conversion by the first control unit so that the number of detected pixels is within a predetermined range. Thereby, a dynamic range of the A/D conversion to the two-dimensional modulated image data can effectively be used. Therefore, a quantization noise due to the A/D conversion can be reduced, and also a reproduction S/N can be improved.

14 Claims, 12 Drawing Sheets

HOLOGRAM REPRODUCTION APPARATUS AND REPRODUCTION METHOD

BACKGROUND OF THE INVENTION

1. Field of the Invention

The present invention relates to a hologram reproduction apparatus which reproduces two-dimensionally modulated digital data.

2. Description of the Related Art

There is known a hologram recording technique which records information to be recorded on a hologram recording medium (hereinafter simply referred to as a "recording medium") as interference fringes. One method for this technique uses the information to be recorded to spatially modulate a light from a light source to generate an object light. The apparatus irradiates the recording medium with an object light and a reference light. The object light and the reference light generate interference fringes on the recording medium, and the interference fringes are recorded in a recording layer of the recording medium. On the other hand, for reproduction, the interference fringes recorded on the recording medium are irradiated only with the reference light. A two-dimensional sensor detects a detected light from the recording medium to reproduce the recording information. An example of the above-mentioned hologram recording and reproduction apparatus is disclosed in Japanese Patent Application Laid-open under No. 11-16374.

There is known such a technique that a gain is adjusted in order to make data suitable for A/D conversion before converting (A/D-converting), into digital data, analog data incorporated into an apparatus and the like, which is called "gain control". The technique is disclosed in Japanese Patent Application Laid-open under No. 9-288309. This document discloses such a technique subjected to control of a natural image that a peak value of the quantized digital data is detected, and that the gain is set to be high when the peak value is smaller than a target peak value (a half of a maximum value of a dynamic range of the A/D conversion) and the gain is set to be low when the peak value is larger than the target peak value.

The gain control disclosed in the above-mentioned document is effective to the natural image. However, in a two-valued image which is two-dimensionally modulated and which is used in the above-mentioned hologram recording technique, a reproduction S/N after the A/D conversion is sometimes decreased. This is because the dynamic range of the A/D conversion cannot sometimes be effectively used to the two-valued image which is two-dimensionally modulated, if the target peak value of the pixel is determined to be the half of the maximum value of the dynamic range of the A/D conversion as described above.

SUMMARY OF THE INVENTION

The present invention has been achieved in order to solve the above problems. It is an object of this invention to provide a hologram reproduction apparatus for executing a signal processing in order to effectively use a dynamic range of A/D conversion at the time of A/D-converting a two-valued image which is two-dimensionally modulated.

According to one aspect of the present invention, there is provided a hologram reproduction apparatus capable of reproducing two-dimensionally modulated image data, including: a light-receiving unit which obtains the two-dimensionally modulated image data; an A/D converter which A/D-converts the image data obtained by the light-receiving unit; a first pixel number detecting unit which detects a number of pixels having a digital value larger than a first defined value in the image data including a predetermined number of A/D-converted pixels; and a first control unit which executes a control so that the number of pixels detected by the first pixel number detecting unit is within a predetermined range.

The above hologram reproduction apparatus includes a light-receiving unit such as a two-dimensional sensor which obtains the two-dimensionally modulated image data, and an A/D converter which A/D-converts, into the digital data, the analog data obtained by the light-receiving unit. In addition, the first pixel number detecting unit detects the number of pixels having the digital value larger than the first defined value in the image data including the predetermined number of pixels in the A/D-converted image data. The hologram reproduction apparatus controls the image data obtained by the first control unit so that the number of detected pixels is within the predetermined range. Thereby, the dynamic range of the A/D conversion to the two-dimensionally modulated image data can effectively be used. Therefore, a quantization noise due to the A/D conversion can be reduced, and reproduction S/N can be improved.

In an embodiment of the above hologram reproduction apparatus, the first defined value may be a maximum digital value. In the embodiment, the hologram reproduction apparatus detects the number of pixels having the maximum digital value in the image data including the predetermined number of pixels in the A/D-converted image data by the first pixel number detecting unit.

In another embodiment of the above hologram reproduction apparatus, the first control unit may control an amplification factor amplifying the image data obtained by the light-receiving unit. In the embodiment, the first control unit controls an amplification factor (hereinafter referred to as "gain") which amplifies the image data so that a magnitude value of the image data before the A/D conversion is changed.

In another embodiment of the above hologram reproduction apparatus, the first control unit may control an exposure time of the light-receiving unit. In the embodiment, the first control unit changes effective photoelectric conversion efficiency by changing the exposure time of the reference light irradiated from a hologram recording apparatus, and controls the image data before the A/D conversion. Namely, the first control unit controls the light-receiving unit so that the light-receiving unit outputs the image data having the preferable magnitude value.

In a preferred embodiment, the first control unit may change an overexposure time and an underexposure time which define a range of the exposure time if the number of pixels detected by the first pixel number detecting unit is not within the predetermined range. The first control unit defines the exposure time within the range defined by the changeable overexposure time and underexposure time, and limits the range which is set by the overexposure time and the underexposure time. Thereby, the first control unit changes the exposure time. As a result, the exposure time stably changes to converge. Therefore, a time necessary for the convergence of the exposure time can be shortened.

In another embodiment of the above hologram reproduction apparatus, the first control unit may control a conversion sensitivity of the A/D converter. In the embodiment, the first control unit of the hologram reproduction apparatus controls an A/D conversion sensitivity of the A/D converter. Namely, the first control unit controls the A/D conversion sensitivity of the dynamic range and the like in order to change the magnitude quantized value of the image data after the A/D conversion.

In another embodiment, the above hologram reproduction apparatus may further include: a second pixel number detecting unit which detects a number of pixels having the digital value smaller than a second defined value in the image data including the predetermined number of A/D-converted pixels; and a second control unit which controls an offset amount of the image data at a time of the A/D conversion so that the number of pixels detected by the second pixel number detecting unit is within a predetermined range. In the embodiment, the second pixel number detecting unit detects the number of pixels having the digital value smaller than the second defined value in the image data including the predetermined number of pixels in the A/D-converted image data. The hologram reproduction apparatus controls the offset of the image data at the time of the A/D conversion by the second control unit so that the number of detected pixels is within the predetermined range. Thereby, the dynamic range of the A/D conversion to the two-dimensional modulated image data can effectively be used, too. Therefore, the quantization noise due to the A/D conversion can be reduced, and the reproduction S/N can also be improved.

Preferably, the second defined value may be a minimum digital value. In this case, the hologram reproduction apparatus detects, by the second pixel number detecting unit, the number of pixels having the minimum digital value in the image data including the predetermined number of pixels in the A/D-converted image data.

More preferably, the second control unit may convert, to a minimum digital value, the image data whose value becomes negative by the control of the offset amount. In the embodiment, the second control unit converts, to the minimum digital value, the image data whose value becomes negative by the control of the offset amount of the image data. Thereby, the dynamic range of the A/D conversion can effectively be used.

In another embodiment, the above hologram reproduction apparatus may further include a unit which adjusts an optical power of an optical system used at a time of the reproduction, when the number of pixels detected by the first pixel number detecting unit does not satisfy a predetermined condition at a time of the control repeatedly executed by the first control unit. As the case that the predetermined condition is not satisfied, there are such cases that the number of pixels detected by the first pixel number detecting unit is far from the defined range, and that the variation of the number of pixels detected by the first pixel number detecting unit is large. In such cases, it is likely that the optical power of the reference light irradiated on the recording medium is not normal. Therefore, the optical power of the optical system is adjusted.

According to another aspect of the present invention, there is provided a hologram reproduction method capable of reproducing two-dimensionally modulated image data, including: a light-receiving process which obtains the two-dimensionally modulated image data; an A/D converting process which A/D-converts the image data obtained in the light-receiving process; a pixel number detecting process which detects a number of pixels having a digital value larger than a defined value in the image data including a predetermined number of A/D-converted pixels; and a control process which executes control so that the number of pixels detected by the pixel number detecting process is within a predetermined range.

According to the above-mentioned hologram reproduction method, the dynamic range of the A/D conversion to the two-dimensional modulated image data can effectively be used, too. Therefore, the quantization noise due to the A/D conversion can be reduced, and the reproduction S/N can be improved.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

Preferred embodiments of the present invention will be described below with reference to the drawings.

[Configuration of Pickup]

Figure 1:
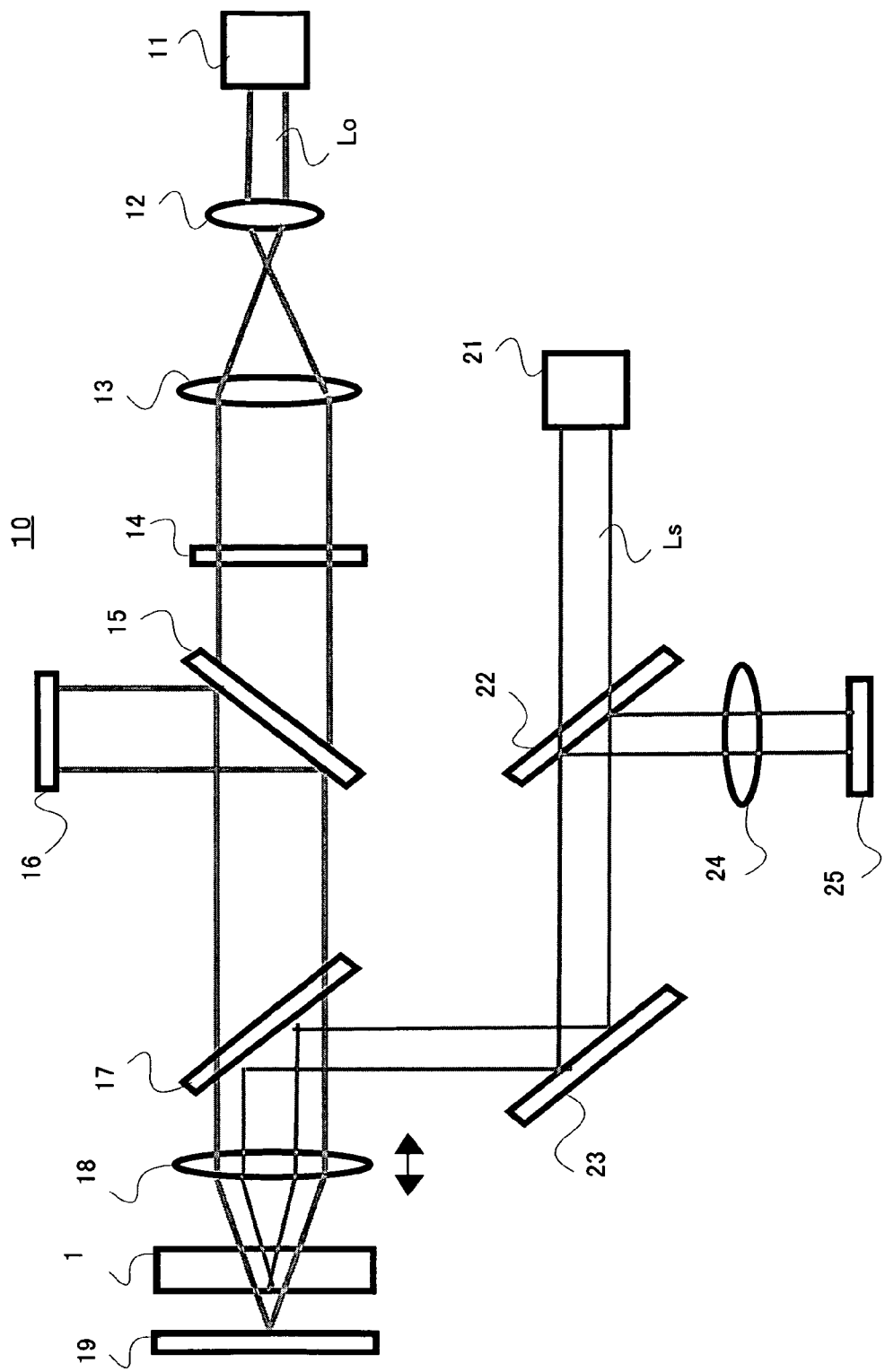
FIG. 1 is a diagram showing a configuration of an optical system of hologram recording and reproduction according to an embodiment of the present invention.

FIG. 1 shows the configuration of an optical system placed in a pickup of a hologram recording and reproduction apparatus according to a first embodiment of the present invention. As the example of the above-mentioned hologram reproduction apparatus, the description will hereinafter be given of a hologram recording and reproduction apparatus capable of recording information on the recording medium and capable of reproducing the information recorded on the recording medium.

In FIG. 1, a pickup 10 includes a recording and reproducing laser 11 that generates a laser light for recording and reproducing information and a servo laser 21 that generates a red laser light for focus servo control.

When information is recorded, a light beam Lo is first emitted by the recording and reproducing laser 11. A beam expander constituted by lenses 12 and 13 increases the diameter of the light beam Lo and inputs the light beam Lo to a spatial modulator 14. The spatial modulator 14 can be constituted by, for example, a liquid crystal element. The spatial modulator 14 has a plurality of pixels arranged like a lattice.

Figure 2A:
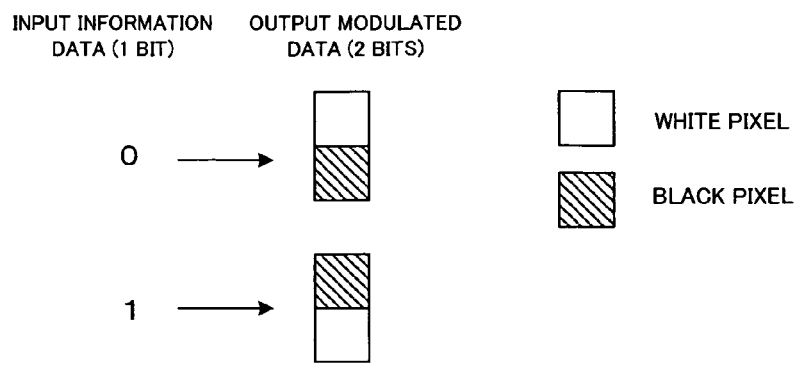
FIGS. 2(a) and 2(b) are diagrams showing an example of a two-dimensional digital modulation system of recording information.

The spatial modulator 14 displays a pattern of white and black pixels obtained by executing a two-dimensional digital modulation of information to be recorded. The spatial modulator 14 uses the pattern to spatially modulate the light beam Lo. FIG. 2(a) shows an example of the two-dimensional modulation executed by the spatial modulator 14. In this example, as shown in FIG. 2(a), digital input information data, that is, information data "0" and "1" to be recorded on a recording medium 1, is expressed using a combination of white and black pixels. An array of white and black pixels arranged in this order in a vertical direction corresponds to the input information data "0". An array of black and white pixels arranged in this order in the vertical direction corresponds to the input information data "1". In this example, 1-bit input information data is converted into 2-bit (2-pixel) two-dimensional modulated data. This example is thus called a 1:2 differential modulation. According to the above two-dimensional digital modulation, the ratio of the white pictures to the black pictures becomes constant. In the above-mentioned modulation example, the ratio of the white pictures to the black pictures becomes 1:1.

Figure 2B:
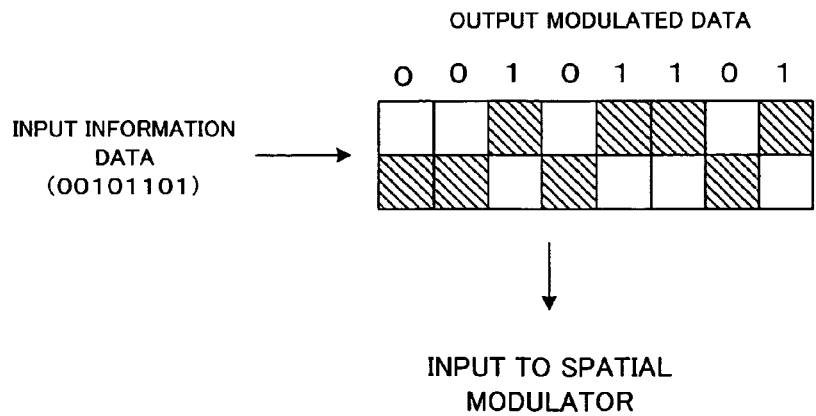

FIG. 2(b) shows, as output modulated data, two-dimensional modulated data obtained by subjecting input information data "00101101" to a two-dimensional digital conversion. Namely, the modulated image pattern constituted by white and black pixels is displayed on the spatial modulator 14 as output modulated data. The light beam Lo incident on the spatial modulator 14 is transmitted through the white pixel portions of the space modulated image pattern. The light beam Lo is blocked in the black pixel portions. Consequently, the spatial modulator 14 emits the light beam Lo optically modulated by the spatially-modulated image pattern. This is an example of a spatial modulation, and the application of the present invention is not limited to the above modulation system. It is possible to use any two-dimensional modulation system such as what is called a 2:4 modulation system that converts 2-bit input information data into 4-bit two-dimensional modulation data, provided that input information data can be converted to two-dimensional modulated image pattern and that the spatial modulator can be driven to spatially modulate a light beam.

The light beam Lo spatially modulated by the spatial modulator 14 passes through a half mirror 15 and a dichroic mirror 17. An objective lens 18 focuses the light beam Lo, and the hologram recording medium 1 is irradiated with the focused light beam. The dichroic mirror 17 has wavelength selectivity. The dichroic mirror 17 allows the light beam Lo from the recording and reproducing laser 11 to pass through, but reflects the light beam Ls from the servo laser 21.

A mirror 19 is provided behind the recording medium 1 (opposite the objective lens 18). The light beam Lo focused by the objective lens 18 passes through the recording medium 1, and is reflected by the mirror 19 and then enters the recording medium 1 again. Accordingly, interference fringes are formed in the recording medium 1 by the light beam entering the recording medium 1 directly from the objective lens 18 and the light beam entering the medium 1 after being reflected by the mirror 19.

The light beam Lo entering the medium 1 after being reflected by the mirror 19 passes through the dichroic mirror 17. The light beam Lo is reflected by a half mirror 15 and then received by a two-dimensional sensor 16. The two-dimensional sensor 16 may be, for example, a CCD array or a CMOS sensor. The two-dimensional sensor 16 outputs an electric signal corresponding to the quantity of the incident light. The two-dimensional sensor 16 serves as a light receiving unit which obtains two-dimensionally modulated image data.

On the other hand, at the time of reproducing information, the spatial modulator 14 is controlled to a non-modulation state (that is, a totally light transmission state). Accordingly, the light beam Lo emitted by the recording and reproducing laser 11 is applied to the recording medium 1 through the half mirror 15, the dichroic mirror 17, and the objective lens 18 without being modulated by the spatial modulator 14. This light becomes a reproduction reference light. In the recording medium 1, a detected light is generated by the reproduction reference light and the interference fringes recorded on the recording medium 1. The detected light passes through the objective lens 18 and dichroic mirror 17. The detected light is then reflected by the half mirror 15 and enters the two-dimensional sensor 16. Thus, a spatially-modulated image pattern of white and black pixels created at the time of recording is formed on the two-dimensional sensor 16, and this pattern is detected to obtain reproduced information corresponding to the recording information.

On the other hand, the light beam Ls emitted by the servo laser 21 (hereinafter referred to as the "servo beam") passes through a half mirror 22 and is then reflected by a mirror 23. The light beam Ls is further reflected by the dichroic mirror 17 and is irradiated on the objective lens 18. The objective lens 18 focuses the servo beam Ls as well as the light beam Lo from the recording and reproducing laser 11 on the recording medium 1. The servo beam Ls is reflected by a reflection layer provided in a back surface of the recording medium 1. The servo beam Ls is further reflected by the dichroic mirror 17, the mirror 23, and the half mirror 22. Then, a cylindrical lens 24 gives, to the servo beam Ls, astigmatism corresponding to the amount of shift from a focal position. A quadruple photo detector 25 then receives the servo beam Ls. The quadruple photo detector 25 outputs an electric signal corresponding to the quantity of light received. Accordingly, by using the quadruple photo detector 25 to detect the amount of astigmatism, it is possible to obtain a focus error indicative of the amount of shift from the focal position.

Figure 3:
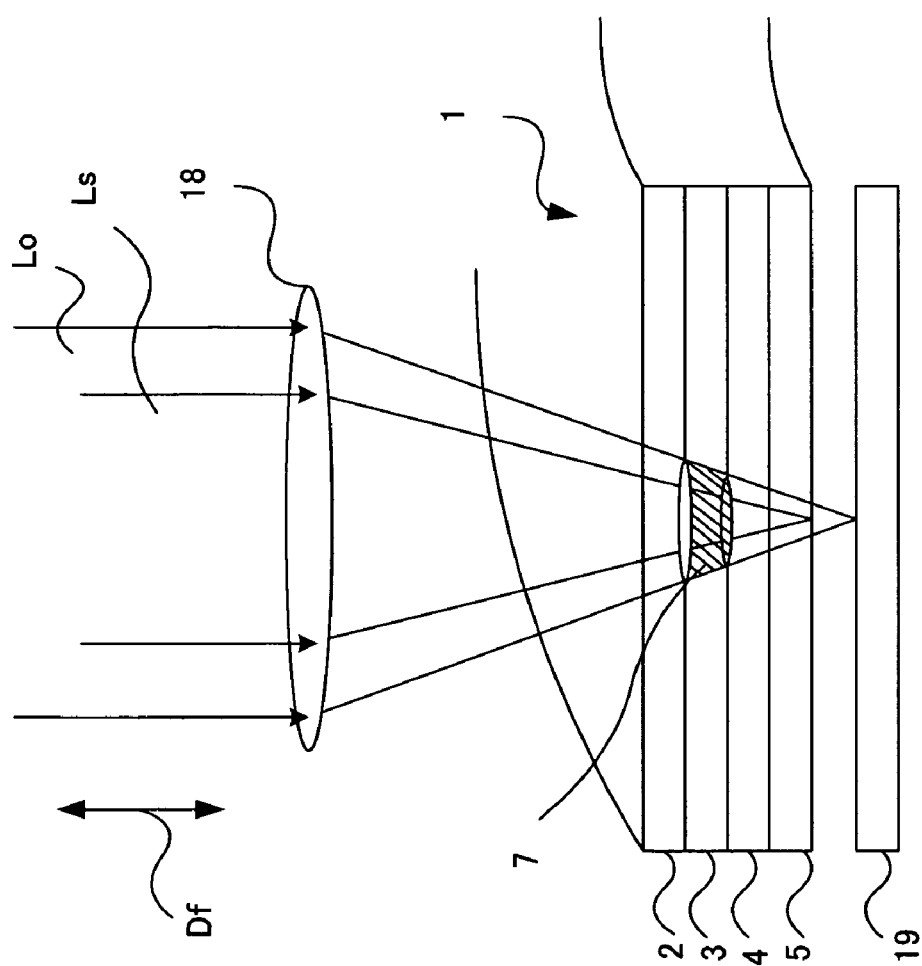
FIG. 3 is a diagram explaining a concept of focus control.

Now, description will be given of operations of the focus servo system. FIG. 3 shows the concept of the focus servo. The recording medium 1 is constituted by a recording layer 3, transparent protective layers 2 and 4 provided over and under the recording layer 3, and a reflection layer 5 provided under the transparent protective layer 4, all these layers being laminated. The recording layer 3 consists of lithium niobate or a photo polymer, which is a hologram optical recording medium. The reflection layer 5 has wavelength selectivity. The reflection layer 5 thus allows the recording and reproducing light beam Lo emitted by the recording and reproducing laser 11 to pass through, but reflects the light beam Ls emitted by the servo laser 21.

The focus servo is a control to move the objective lens 18 in the vertical direction Df of FIG. 3 so that the recording layer 3 is appropriately irradiated with the recording and reproducing light beam Lo. More specifically, the position of the objective lens 18 is controlled so that the servo light beam Ls is accurately focused on the reflection layer 5 of the recording medium 1.

As shown in FIG. 1, the objective lens 18 focuses the recording and reproducing light beam Lo spatially modulated by the spatial modulator 14, on the recording medium 1. Part of the light beam Lo is reflected by the mirror 19 and then enters the recording medium 1 again. Consequently, interference fringes 7 are recorded on the recording layer 3 by the light incident beam Lo before reflected by the mirror 19 and the light beam Lo after reflected by the mirror 19.

When the objective lens 18 is moved in the vertical direction Df of FIG. 3, the diameter of the light beam Lo focused by the objective lens 18 and entering the recording layer 3 varies. This varies the volume of the interference fringes 7 recorded on the recording layer 3. The hologram recording according to the present embodiment is volume hologram recording in which the interference fringes are three-dimensionally recorded on the recording medium, that is, also in its thickness direction. The focus servo in the volume hologram recording is intended to adjust the vertical recording position of the three-dimensional interference fringes recorded on the recording layer 3 of the recording medium 1 and to maintain the volume of the three-dimensional interference fringe at a fixed value. When the vertical recording position or volume of the three-dimensional interference fringe changes, the crosstalk characteristic between the interference fringes is degraded and it becomes severe to prevent the improvement of the recording density. Therefore, the recording density can be improved by precisely carrying out the focus servo.

As shown in FIG. 1, in the present embodiment, in addition to the recording and reproducing light beam Lo, the servo light beam Ls emitted by the servo laser 21 is irradiated on the recording medium 1. The servo beam Ls is reflected by the reflection layer 5 and further by the dichroic mirror 17, the mirror 23, and the half mirror 22. Then, the servo light beam Ls passes through the cylindrical lens 24 and then enters the quadruple photo detector 25. The servo light beam Ls incident on the quadruple photo detector 25 includes astigmatism corresponding to the amount of shift from the focal position caused by the cylindrical lens 24. Consequently, a focus error signal FE indicative of the amount of astigmatism is obtained by calculating output signals from the quadruple photo detector 25.

First Embodiment

Figure 4:
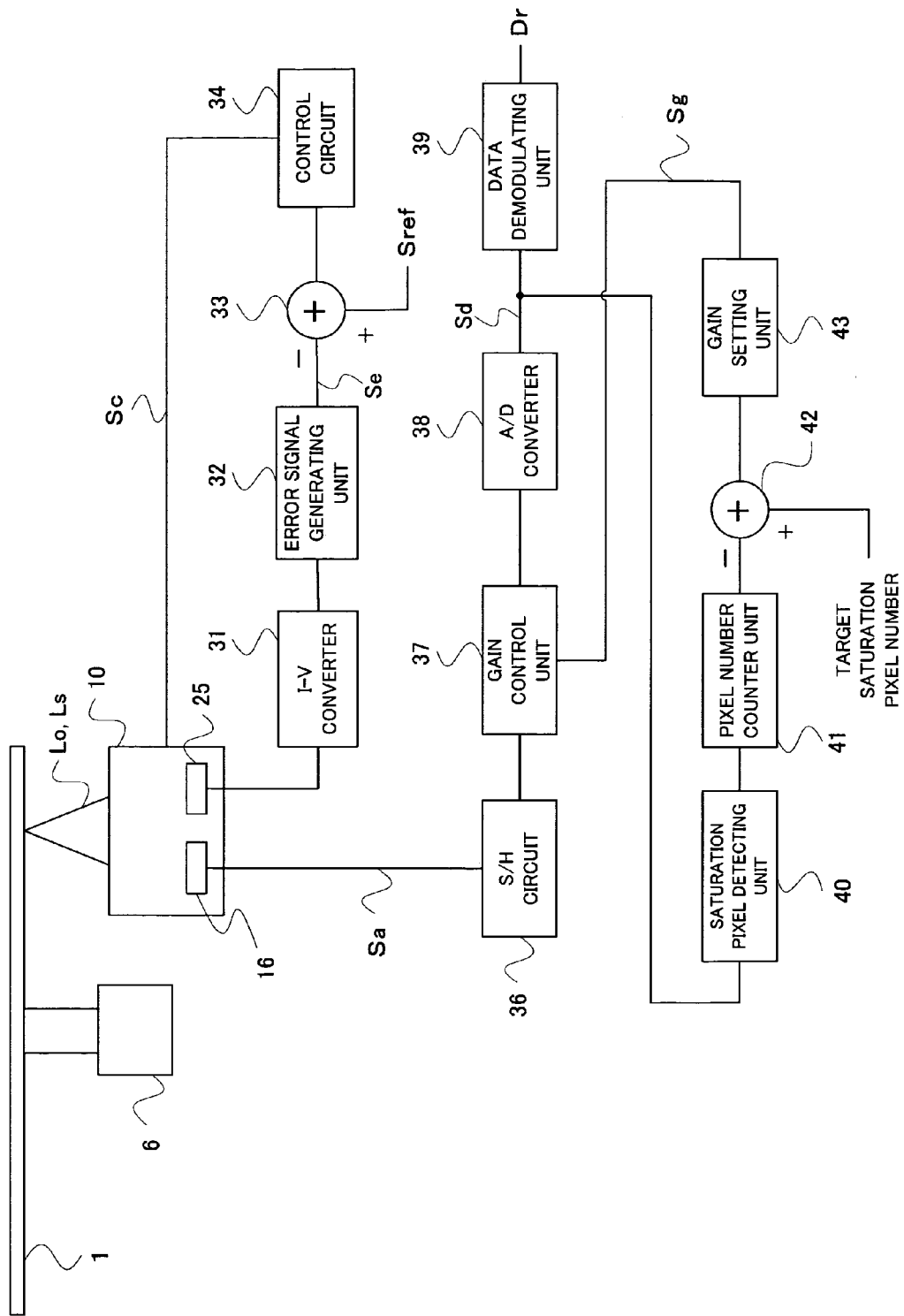
FIG. 4 is a block diagram schematically showing a configuration of a signal processing system of a hologram recording and reproduction apparatus according to a first embodiment of the present invention.

Next, description will be given of the hologram recording and reproduction apparatus according to a first embodiment of the present invention. FIG. 4 is a block diagram schematically showing the configuration of the signal processing system of the hologram recording and reproduction apparatus according to the first embodiment.

The signal processing system of the hologram recording and reproduction apparatus is roughly divided into a reproduction system that reproduces recording information to output reproduced information data and a servo system that performs servo control such as a focus servo, a tracking servo and a spindle servo. FIG. 4 schematically shows the configuration of the reproduction system and a focus servo system included in the servo system. In FIG. 4, the reproduction system is constituted by a S/H circuit 36, a gain control unit 37, an A/D converter 38, a data demodulating unit 39, a saturation pixel detecting unit 40, a pixel number counter unit 41, an adder 42 and a gain setting unit 43. Further, the servo system is constituted by an I-V converter 31, an error signal generating unit 32, an adder 33 and a control circuit 34. It is noted that the servo system includes the tracking servo, the focus servo and the like.

In FIG. 4, the recording medium 1 is shaped like a disc. A spindle motor 6 controls the rotation of the recording medium 1. The recording medium 1 controllably rotated by the spindle motor 6 is irradiated with the recording and reproducing light beam Lo from the pickup 10. The pickup 10 includes the optical system illustrated in FIG. 1. As shown in FIG. 1, from the pickup 10, the recording medium 1 is irradiated with the light beam Lo emitted by the recording and reproducing laser 11. The two-dimensional sensor 16 receives the detected light from the recording medium 1. Output data from the two-dimensional sensor 16 is mainly processed by the reproduction system. Further, the recording medium 1 is also irradiated with the light beam Ls emitted by the servo laser 21. The quadruple photo detector 25 receives the return light beam. An output signal from the quadruple photo detector 25 is processed by the servo system.

In the servo system, the I-V converter 31 converts, to the output voltage, the output current from the quadruple photo detector 25, and the error signal generating unit 32 generates the error signal Se such as the tracking error signal and the focus error signal by a known method. The adder 33 compares the error signal with a predetermined reference signal Sref, and the control circuit 34 generates the control signal Sc based on the comparison result to supply it to the pickup 10. The actuator (not shown) in the pickup 10 controls the relative position in the tracking direction and focus direction of the objective lens 18 with respect to the recording medium 1 based on the control signal Sc. In that way, the tracking servo and the focus servo are executed.

Next, the operation of the reproduction system will be described. In FIG. 4, the two-dimensional sensor 16 in the pickup 10 outputs a two-dimensional image signal (hereinafter referred to as "analog image data Sa") corresponding to the quantity of light received.

The S/H circuit 36 holds the image of one page based on the analog image signal Sa outputted from the two-dimensional sensor 16, and supplies the held image to the gain control unit 37. The image of one page is data of 100×100=10000 pixels for example, which can be specified by detecting the markers added to the image data.

The gain control unit 37 gain-controls the image data of one page obtained from the S/H circuit 36 to have the magnitude suitable for the subsequent A/D conversion. The gain control unit 37 executes the gain control based on a signal Sg corresponding to the gain setting value set and supplied from the gain setting unit 43 which will be explained later. The image data gain-controlled by the gain control unit 37 is supplied to the A/D converter 38. It is noted that the gain control unit 37 is constructed by a variable gain amplifier capable of amplifying the magnitude of the inputted signal to output it, for example.

The A/D converter 38 converts, into the digital data, the analog image data obtained from the gain control unit 37. The A/D converter 38 functions as the A/D converting unit which A/D-converts the image data obtained by the light-receiving unit. The A/D-converted digital image data Sd is supplied to the data demodulating unit 39 and the saturation pixel detecting unit 40.

The data demodulating unit 39 performs a geometrical correction of the obtained digital image data Sd, and demodulates the data after the geometrical correction by the demodulation system, which corresponds to the two-dimensional digital modulation system applied by the spatial modulator 14 at the time of recording, to output reproduction information data Dr corresponding to the recording data. It is noted that a subsequent process including deinterleaving, descrambling and an error correction is applied to the reproduction information data Dr afterward.

Next, the description will be given of a process in processing units subsequent to the saturation pixel detecting unit 40 to which the digital image data Sd is supplied. Those processing units execute a process of calculating the amplification factor (gain), at which the analog image data Sa is appropriately A/D-converted, based on the digital image data Sd obtained from the A/D converter 38.

First, the saturation pixel detecting unit 40 detects, from the obtained digital image data Sd, the image data which is saturated at the maximum value larger than the dynamic range of the A/D conversion (hereinafter referred to as "saturation pixel"). For example, when the image after the A/D conversion is prescribed as the digital image data of 5 bits, the maximum value of the digital value after the A/D conversion becomes "32". The saturation pixel detecting unit 40 outputs the data relating to the saturation pixel to the pixel number counter unit 41. The pixel number counter unit 41 counts the number of the saturation pixels (hereinafter referred to as "saturation pixel number") from the obtained data. The pixel number counter unit 41 counts the saturation pixel number of the image data of one page, for example. The pixel number counter unit 41 supplies the counted saturation pixel number to the adder 42. As described above, the saturation pixel detecting unit 40 and the pixel number counter unit 41 function as the first pixel number detecting unit which detects the number of pixels having the digital value larger than the first defined value in the image data including the predetermined number of A/D-converted pixels.

The adder 42 compares the saturation pixel number obtained from the pixel number counter unit 41 with the target saturation pixel number. The target saturation pixel number is a preset value. For example, if one page has 100×100=10000 pixels, the target saturation pixel number is 100 pixels, which corresponds to 1% of the pixels of one page. The adder 42 supplies, to the gain setting unit 43, the comparison result of the saturation pixel number and the target saturation pixel number. The gain setting unit 43 calculates the gain setting value Sg based on the comparison result so that the gain control before the A/D conversion is appropriately executed. Then, the gain setting unit 43 supplies the gain setting value Sg to the gain control unit 37. The gain setting value Sg is used at the time of executing the gain control so that the saturation pixel number of the image data after the A/D conversion becomes a suitable amount (target saturation pixel number). Namely, the gain setting unit 43 calculates the gain setting value Sg at which the saturation pixel number indicating the number of pixels larger than the dynamic range of the A/D conversion becomes the suitable amount. Concretely, when the saturation pixel number for one page is larger than the target saturation pixel number, the gain setting unit 43 determines that the saturation pixel number becomes large because the gain is too large. Therefore, the gain setting unit 43 outputs the gain setting value Sg to the gain control unit 37 in order to decrease the gain. On the contrary, when the saturation pixel number for one page is small, the gain setting unit 43 determines that the saturation pixel number becomes small because the gain is too small. Therefore, the gain setting unit 43 outputs the gain setting value Sg to the gain control unit 37 in order to increase the gain.

The gain control unit 37 amplifies the image data of one page supplied from the S/H circuit 36 based on the gain setting value Sg supplied from the gain setting unit 43, which is referred to as "gain control". The gain control unit 37 functions as the first control unit which controls the image data at the time of executing the A/D conversion so that the number of pixels detected by the above-mentioned first pixel number detecting unit is within the predetermined range. Thereby, the saturation pixel number for one page becomes coincident with the target saturation pixel number. When the image data becomes larger than the maximum value (e.g., 32) of the digital value by the gain control, the A/D converter 38 converts the image data to the maximum value of the digital value. The process is referred to as "overflow process". Namely, the level of the white pixel is reduced so that the dynamic range relating to the A/D conversion is effectively used.

Figure 5:
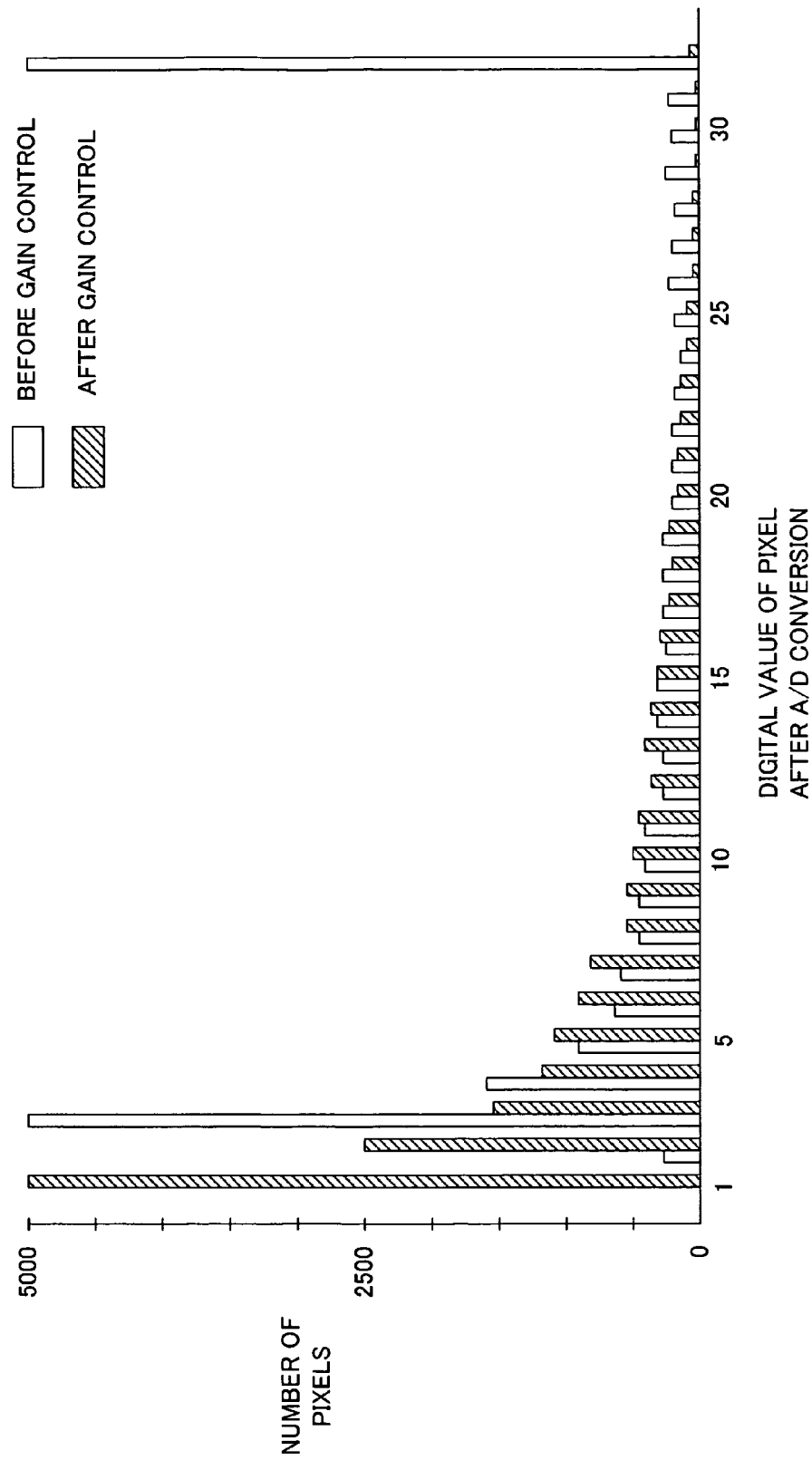
FIG. 5 is a histogram showing an example of digital values of pixels before and after gain control.
Figure 6:
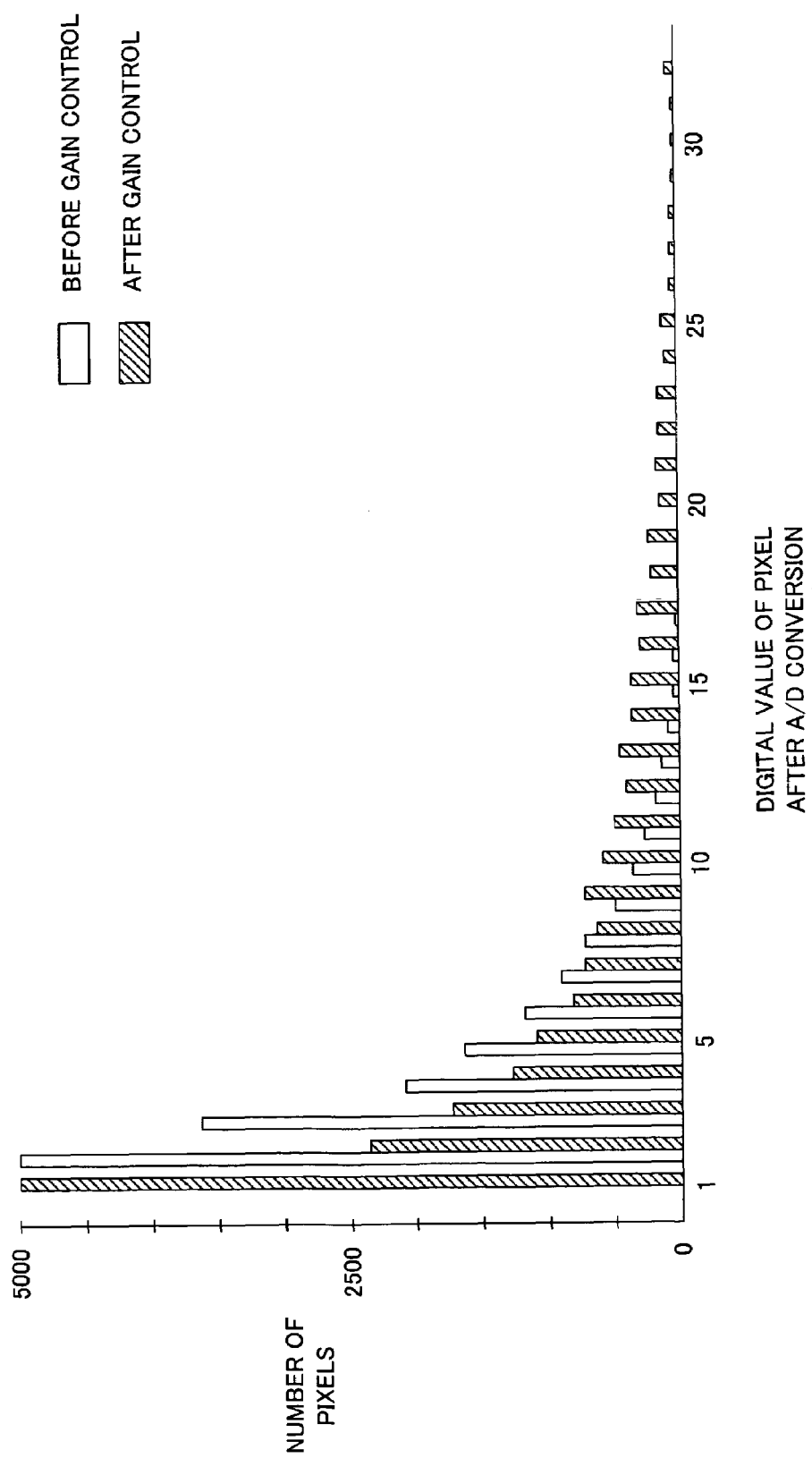
FIG. 6 is a histogram showing another example of the digital values of the pixels before and after the gain control.

FIG. 5 and FIG. 6 specifically show examples of the gain-controlled image data. FIG. 5 and FIG. 6 are histogram distributions in which the horizontal axis indicates the digital value of the pixel after the A/D conversion and the vertical axis indicates the number of pixels. FIG. 5 and FIG. 6 show examples in a case that the data is converted to the digital data of 5 bits by the A/D converter 38. As the digital value on the horizontal axis becomes larger, luminance of the pixel becomes higher, and as the digital value on the horizontal axis becomes smaller, the luminance of the pixel becomes lower. Namely, the pixel of the digital value "1" shows black, and the pixel of the digital value "32" shows white. An outline stick shows the data before the gain control, and a diagonal stick shows the data after the gain control.

In FIG. 5, it is understood that the image data before the gain control has the large saturation pixel number and the distribution of the image data is biased to the right of the graph. On the contrary, in FIG. 6, it is understood that the image data before the gain control has no saturation pixel (the pixel whose digital value is 32) and the distribution of the image data is biased to the left of the graph. Namely, it is understood that the image data before the gain control shown in FIG. 5 and FIG. 6 are obtained when the dynamic range of the A/D conversion is not effectively used.

In the case of the image data before the gain control shown in FIG. 5, since the saturation pixel number for one page is larger than the target saturation pixel number, the gain setting unit 43 determines that the saturation pixel number becomes large because the gain is too large. Therefore, the gain setting unit 43 outputs the gain setting value Sg to the gain control unit 37 in order to decrease the gain. On the contrary, in the case of the image data before the gain control shown in FIG. 6, since the saturation pixel number for one page is small, the gain setting unit 43 determines that the saturation pixel number becomes small because the gain is too small. Therefore, the gain setting unit 43 outputs the gain setting value Sg to the gain control unit 37 in order to increase the gain. When the gain control is executed to the image data before the gain control shown in FIG. 5 and FIG. 6 by using such the gain setting value Sg, as shown in FIG. 5 and FIG. 6, it is understood that the distribution of the image data spreads over the entire dynamic range of the A/D conversion and is set to the suitable saturation pixel number (target saturation pixel number). Therefore, it is understood that the dynamic range of the A/D conversion is efficiently used by the above-mentioned gain control.

As described above, in the first embodiment, the number of the saturation pixels larger than the dynamic range of the A/D conversion is detected, and the gain control is executed so that the saturation pixel number for one page becomes the suitable amount. Thereby, the dynamic range of the A/D conversion can effectively be used. Therefore, the quantization noise due to the A/D conversion can be reduced, and as a result, the reproduction S/N can be improved.

In the above hologram recording and reproduction apparatus, the description was given of such the embodiment that the magnitude value of the image data before the A/D conversion is controlled. However, the image data may be controlled at the time of the A/D conversion. A specific modification thereof will be explained with reference to FIG. 7, below.

Figure 7:
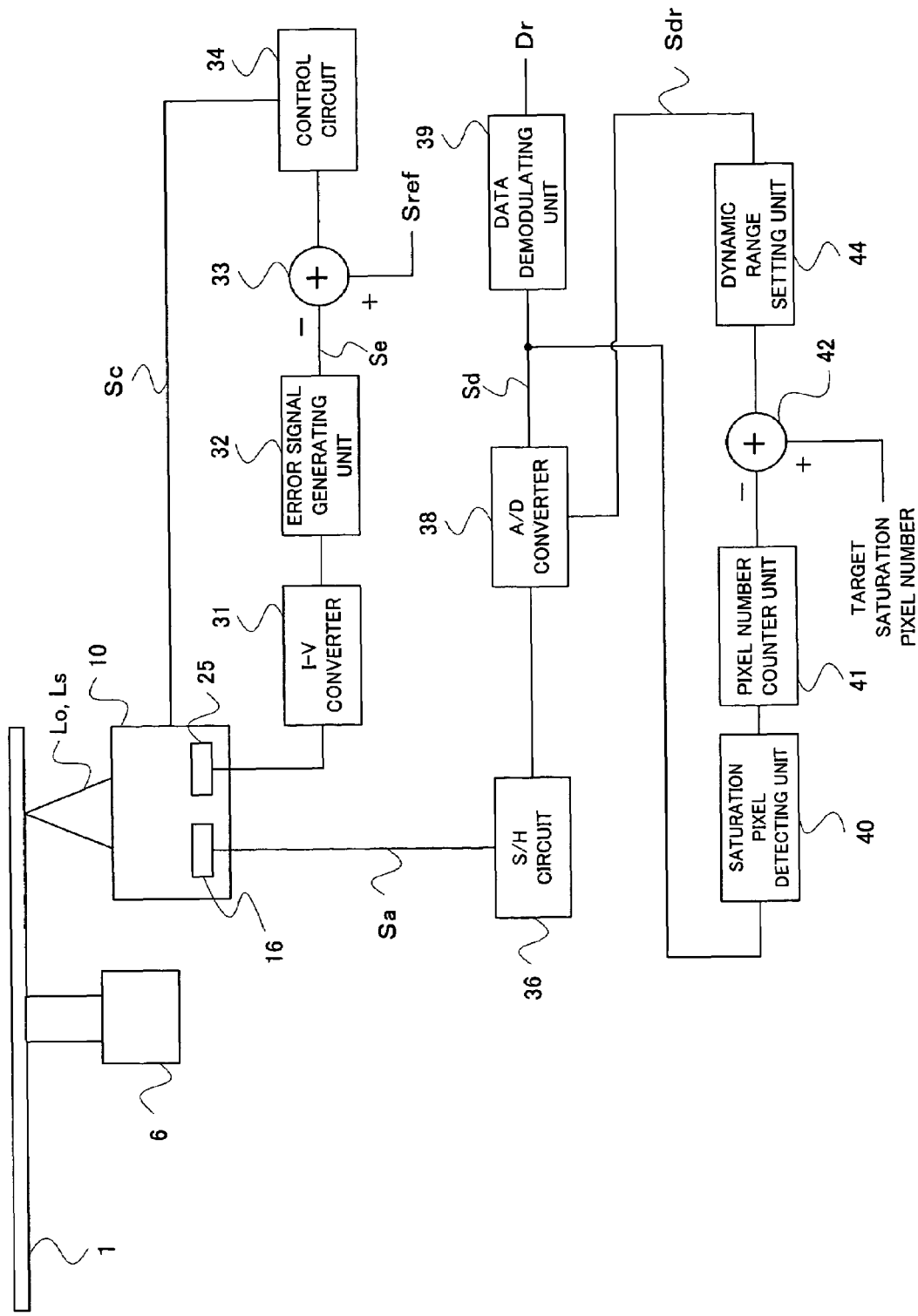
FIG. 7 is a block diagram schematically showing a configuration of the signal processing system of the hologram recording and reproduction apparatus according to a modification of the first embodiment.

FIG. 7 is a block diagram schematically showing a configuration of the signal processing system of the hologram recording and reproduction apparatus according to a modification. The servo system is similar to the servo system shown in FIG. 4. The reproduction system is constructed by the S/H circuit 36, the A/D converter 38, the data demodulating unit 39, the saturation pixel detecting unit 40, the pixel number counter unit 41, the adder 42 and a dynamic range setting unit 44. Namely, the reproduction system according to the present modification includes the dynamic range setting unit 44, instead of the gain control unit 37 and the gain setting unit 43. In this point, the reproduction system according to the present modification is different from the reproduction system shown in FIG. 4.

The adder 42 supplies, to the dynamic range setting unit 44, the comparison result of the saturation pixel number and the target saturation pixel number, similarly to the above-mentioned adder 42. The dynamic range setting unit 44 calculates the conversion sensitivity Sdr based on the comparison result so that the conversion sensitivity (or the dynamic range) at the time of the A/D conversion becomes suitable. Then, the dynamic range setting unit 44 supplies the conversion sensitivity Sdr to the A/D converter 38. The dynamic range setting unit 44 calculates the conversion sensitivity Sdr in the A/D conversion at which the number of the saturation pixels larger than the dynamic range of the A/D conversion becomes the suitable amount. As the conversion sensitivity Sdr, there are known 256 [digit/V] outputting the digital value of 8 [bit] at 1 [V] and 128 [digit/V] outputting the digital value of 8 [bit] at 2 [V].

The A/D converter 38 executes the A/D conversion in accordance with the conversion sensitivity Sdr supplied from the dynamic range setting unit 44. Thereby, the saturation pixel number for one page becomes coincident with the target saturation pixel number. As described above, even if the A/D conversion sensitivity at the time of the A/D conversion is controlled, the dynamic range at the time of the A/D conversion can effectively be used, and the quantization noise due to the A/D conversion can be reduced.

Second Embodiment

Figure 8:
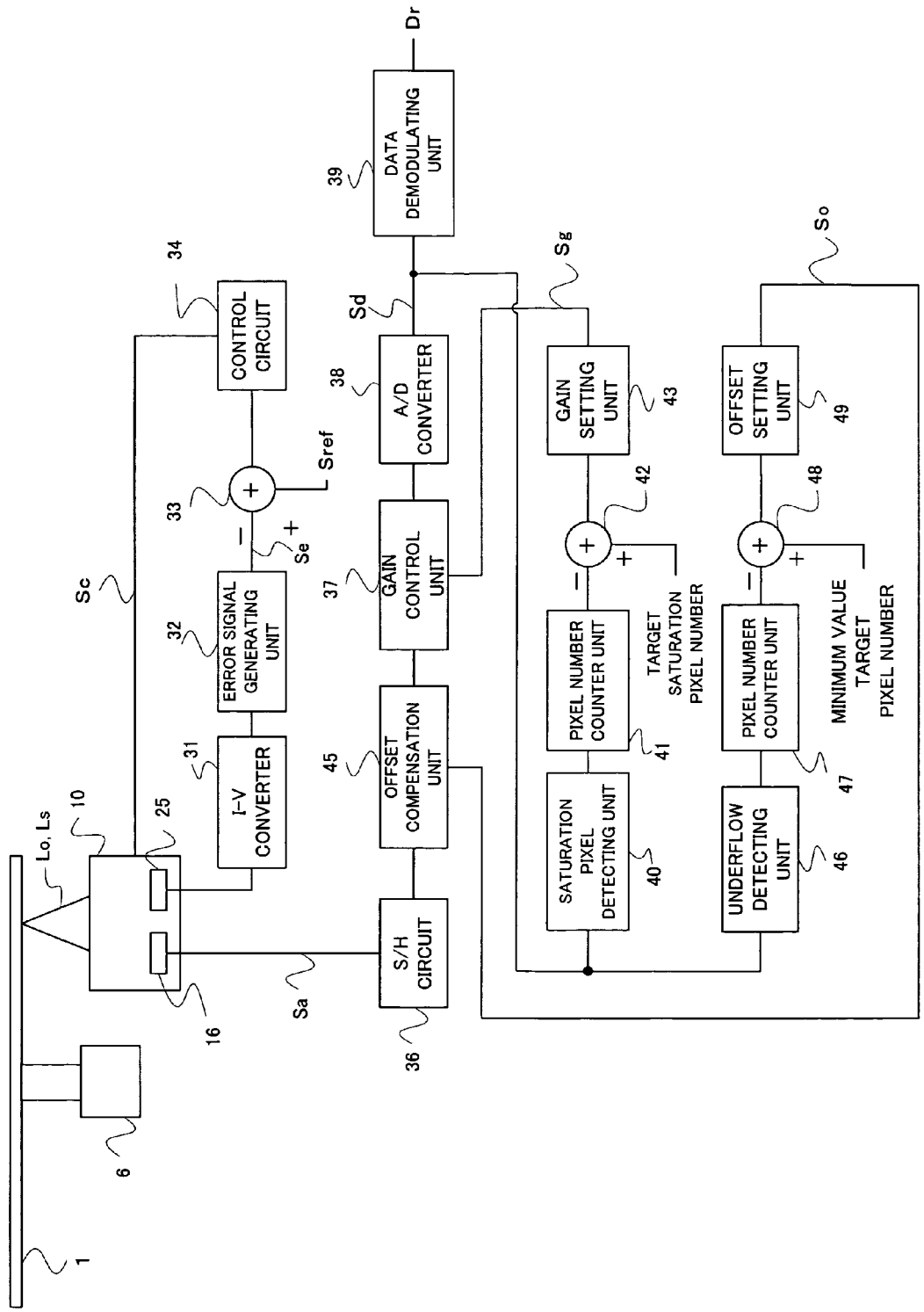
FIG. 8 is a block diagram schematically showing a configuration of the signal processing system of the hologram recording and reproduction apparatus according to a second embodiment of the present invention.

Next, the description will be given of the hologram recording and reproduction apparatus according to a second embodiment of the present invention. FIG. 8 is a block diagram schematically showing a configuration of the signal processing system of the hologram recording and reproduction apparatus according to the second embodiment.

FIG. 8 schematically shows a configuration of the reproduction system and the servo system of the hologram recording and reproduction apparatus according to the second embodiment. Since the servo system of the hologram recording and reproduction apparatus according to the second embodiment is similar to the servo system shown in the above first embodiment, an explanation thereof is omitted.

The reproduction system is constructed by the S/H circuit 36, an offset compensation unit 45, the gain control unit 37, the A/D converter 38, the data demodulating unit 39, the saturation pixel detecting unit 40, the pixel number counter unit 41, the adder 42, the gain setting unit 43, an underflow detecting unit 46, a pixel number counter unit 47, an adder 48 and an offset setting unit 49. The hologram recording and reproduction apparatus according to the second embodiment includes the offset compensation unit 45, the underflow detecting unit 46, the pixel number counter unit 47, the adder 48 and the offset setting unit 49. In this point, the apparatus according to the second embodiment is different from the apparatus according to the first embodiment. Therefore, only an explanation of those processing units will be given below.

First, the underflow detecting unit 46 detects the pixel whose digital image data Sd after the A/D conversion is lower than the bottom level of the A/D conversion, which is herein after referred to as "underflow pixel". That is, when the digital image data of 5 bits is generated by the A/D conversion, the underflow detecting unit 46 detects the pixel whose digital value becomes "1", for example. The underflow detecting unit 46 supplies the data of the underflow pixel to the pixel number counter unit 47. The pixel number counter unit 47 counts a number of underflow pixels (hereinafter referred to as "underflow pixel number") from the obtained data. On finishing counting the underflow pixel number for one page, the pixel number counter unit 47 supplies the counted underflow pixel number to the adder 48. As described above, the underflow detecting unit 46 and the pixel number counter unit 47 function as the second pixel number detecting units which detect the number of pixels having the digital value smaller than the second defined value in the image data including the predetermined number of A/D-converted pixels.

The adder 48 compares the underflow pixel number obtained from the pixel number counter unit 47 with a minimum value target pixel number. The minimum value target pixel number is preset. The adder 48 supplies, to the offset setting unit 49, the comparison result of the underflow pixel number and the minimum value target pixel number. The offset setting unit 49 calculates an offset setting value So based on the comparison result so that offset compensation before the A/D conversion is suitably executed. Then the offset setting unit 49 supplies the offset setting value So to the offset compensation unit 45. Concretely, when the underflow pixel number for one page is larger than the minimum value target pixel number, the offset setting unit 49 determines that the offset amount becomes too negative. Then, the offset setting unit outputs the offset setting value So to the offset compensation unit 45 so that the offset amount becomes positive. On the contrary, when the underflow pixel number is smaller than the minimum value target pixel number, the offset setting unit 49 determines that the offset amount becomes too positive. Then, the offset setting unit 49 outputs the offset setting value So to the offset compensation unit 45 so that the offset amount becomes negative.

The offset compensation unit 45 performs the offset compensation to the image data of one page supplied from the S/H circuit 36 based on the offset setting value So obtained from the offset setting unit 49. The offset compensation unit 45 functions as the second control unit which controls the offset amount of the image data before the A/D conversion so that the number of pixels detected by the above-mentioned second pixel number detecting unit is within the predetermined range. Thereby, for some pixels, the image data before the A/D conversion becomes larger than the bottom range of the A/D converter 38. When the offset setting value So is set in order to make the offset amount negative, the A/D converter 38 converts the image data of the pixel whose value becomes negative to the minimum digital value (e.g., "1"). This process is referred to as "underflow process". Namely, the level of the black pixel is increased so that the dynamic range relating to the A/D conversion is effectively used.

As described above, in the hologram recording and reproduction apparatus according to the second embodiment, the dynamic range of the A/D conversion can more effectively be used by executing not only the gain control but also the offset compensation. Thereby, the quantization noise by the A/D conversion can be further reduced, and the reproduction S/N can be improved.

In the hologram recording and reproduction apparatus shown in FIG. 8, the example that the offset compensation unit 45 is arranged before the gain control unit 37 is shown, but the invention is not limited to that. For example, the offset compensation may be executed after the gain control, and only the offset compensation may be executed without the gain control. Moreover, the offset compensation may be executed twice before and after the gain control. When the offset compensation is executed twice before and after the gain control, the dynamic range of the A/D conversion is effectively used, and the reproduction S/N is further improved.

Third Embodiment

Figure 9:
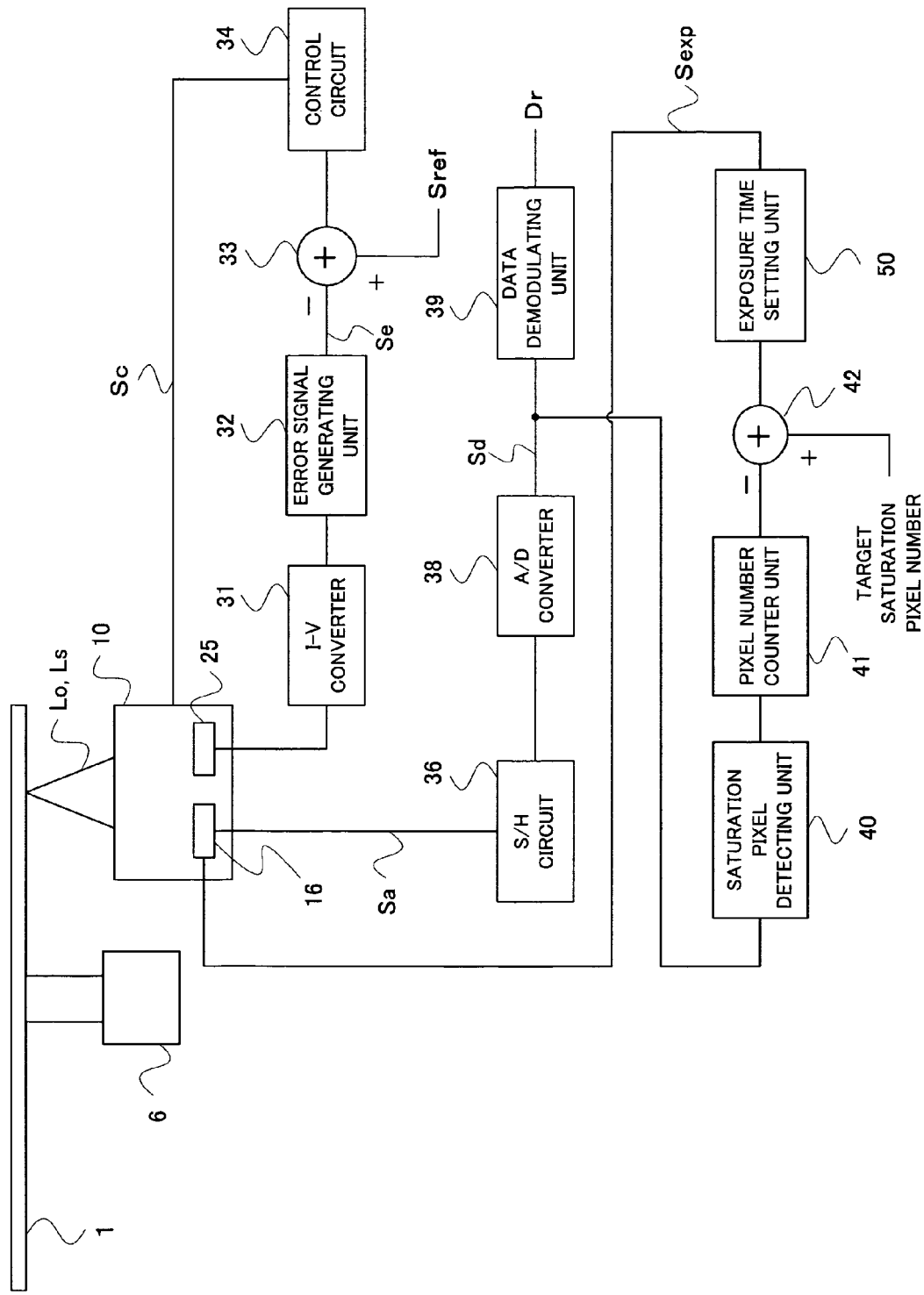
FIG. 9 is a block diagram schematically showing a configuration of the signal processing system of the hologram recording and reproduction apparatus according to a third embodiment of the present invention.

Next, the description will be given of the hologram recording and reproduction apparatus according to a third embodiment of the present invention. FIG. 9 is a block diagram schematically showing a configuration of the signal processing system of the hologram recording and reproduction apparatus according to the third embodiment.

FIG. 9 schematically shows a configuration of the reproduction system and the servo system of the hologram recording and reproduction apparatus according to the third embodiment. Since the servo system of the hologram recording and reproduction apparatus according to the third embodiment is similar to the above-mentioned embodiments, an explanation thereof is omitted.

In the third embodiment, the gain (amplification factor) of an amplifier or the like is not changed, but an exposure time of the reference light is changed. Thereby, the effective photoelectric conversion efficiency is changed, and the magnitude value of the image signal before the A/D conversion is changed. Namely, though the signal outputted from the two-dimensional sensor 16 is processed in the first embodiment, the two-dimensional sensor itself is controlled so that the two-dimensional sensor 16 outputs the signal having the preferable magnitude value in the third embodiment. Therefore, the reproduction system of the hologram recording and reproduction apparatus according to the third embodiment does not include the gain control unit 37 and the offset compensation unit 45 in the above-mentioned embodiments. Instead, the reproduction system according to the third embodiment includes an exposure time setting unit 50. Therefore, processing units which execute a process for changing the exposure time will mainly be explained below.

The saturation pixel detecting unit 40 detects the saturation pixel from the digital image data Sd obtained from the A/D converter 38, and outputs the data relating to the saturation pixel to the pixel number counter unit 41. The pixel number counter unit 41 counts the number of the saturation pixels from the obtained data, and supplies the counted saturation pixel number to the adder 42. The adder 42 compares the saturation pixel number obtained from the pixel number counter unit 41 with the target saturation pixel number. The target saturation pixel number is preset. The adder 42 supplies the comparison result of the saturation pixel number and the target saturation pixel number to the exposure time setting unit 50.

Based on the comparison result, the exposure time setting unit 50 calculates the exposure time at which the two-dimensional sensor 16 outputs the signal having the preferable magnitude value, and supplies, to the two-dimensional sensor 16, the signal Sexp corresponding to the exposure time. The exposure time setting unit 50 functions as the first control unit which controls the image data at the time of the A/D conversion so that the number of pixels detected by the above first pixel number detecting unit is within the predetermined range. Concretely, when the saturation pixel number for one page is larger than the target saturation pixel number, the exposure time setting unit 50 determines that the exposure time is so long that the saturation pixel number becomes large. Therefore, the exposure time setting unit 50 outputs, to the two-dimensional sensor 16, the signal Sexp corresponding to the exposure time in order to make the exposure time short. Thereby, the signal whose magnitude value has become small is outputted from the two-dimensional sensor 16. On the contrary, when the saturation pixel number for one page is small, the exposure time setting unit 50 determines that the exposure time is so short that the saturation pixel number becomes small. Therefore, the exposure time setting unit 50 outputs, to the two-dimensional sensor 16, the signal Sexp corresponding to the exposure time in order to make the exposure time long. Thereby, the signal whose magnitude value has become large is outputted from the two-dimensional sensor 16.

As described above, if the photoelectric conversion efficiency of the two-dimensional sensor 16 is changed, not by changing the amplification factor of the amplifying unit of the image signal, but by changing the exposure time in the two-dimensional sensor 16, the dynamic range of the A/D conversion can effectively be used.

In the hologram recording and reproduction apparatus according to the third embodiment, by arranging the gain control unit 37 shown in the first embodiment and the offset compensation unit 45 shown in the second embodiment, the process of not only changing the exposure time but also controlling the magnitude value or the offset amount of the image signal may be executed.

Figure 10:
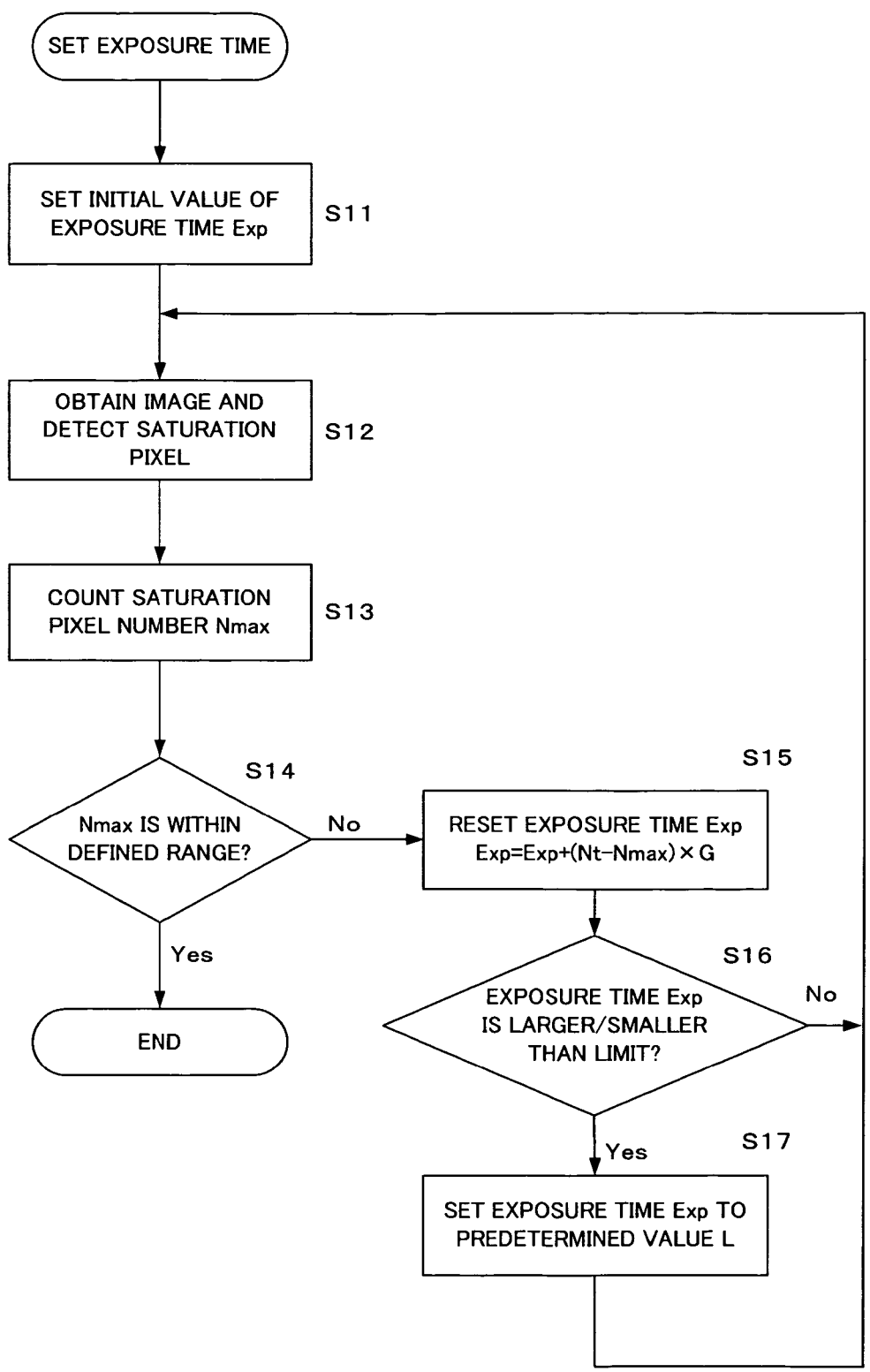
FIG. 10 is a flow chart showing an example of a setting process of an exposure time.
Figure 11:
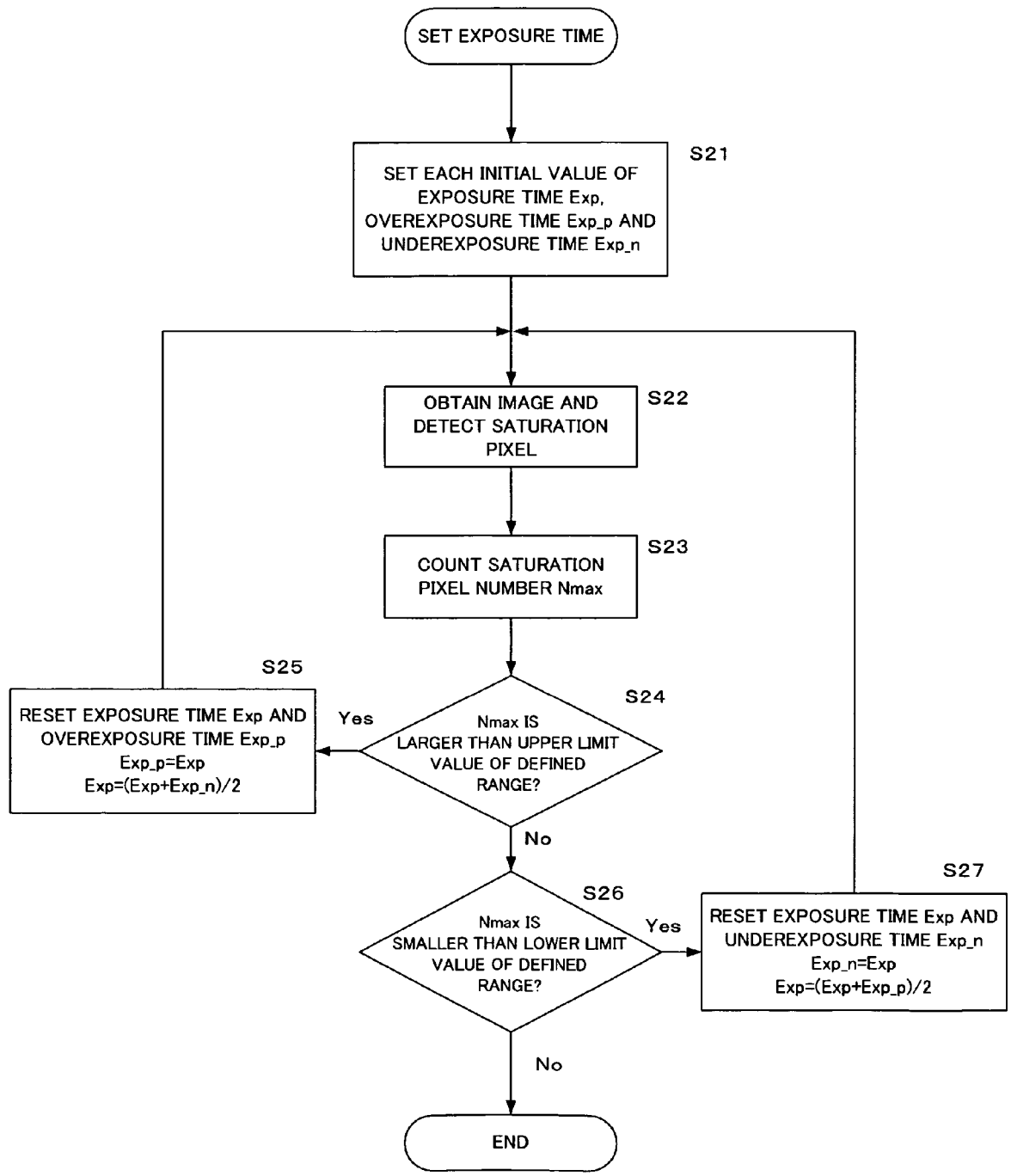
FIG. 11 is a flow chart showing another example of the setting process of the exposure time.
Figure 12:
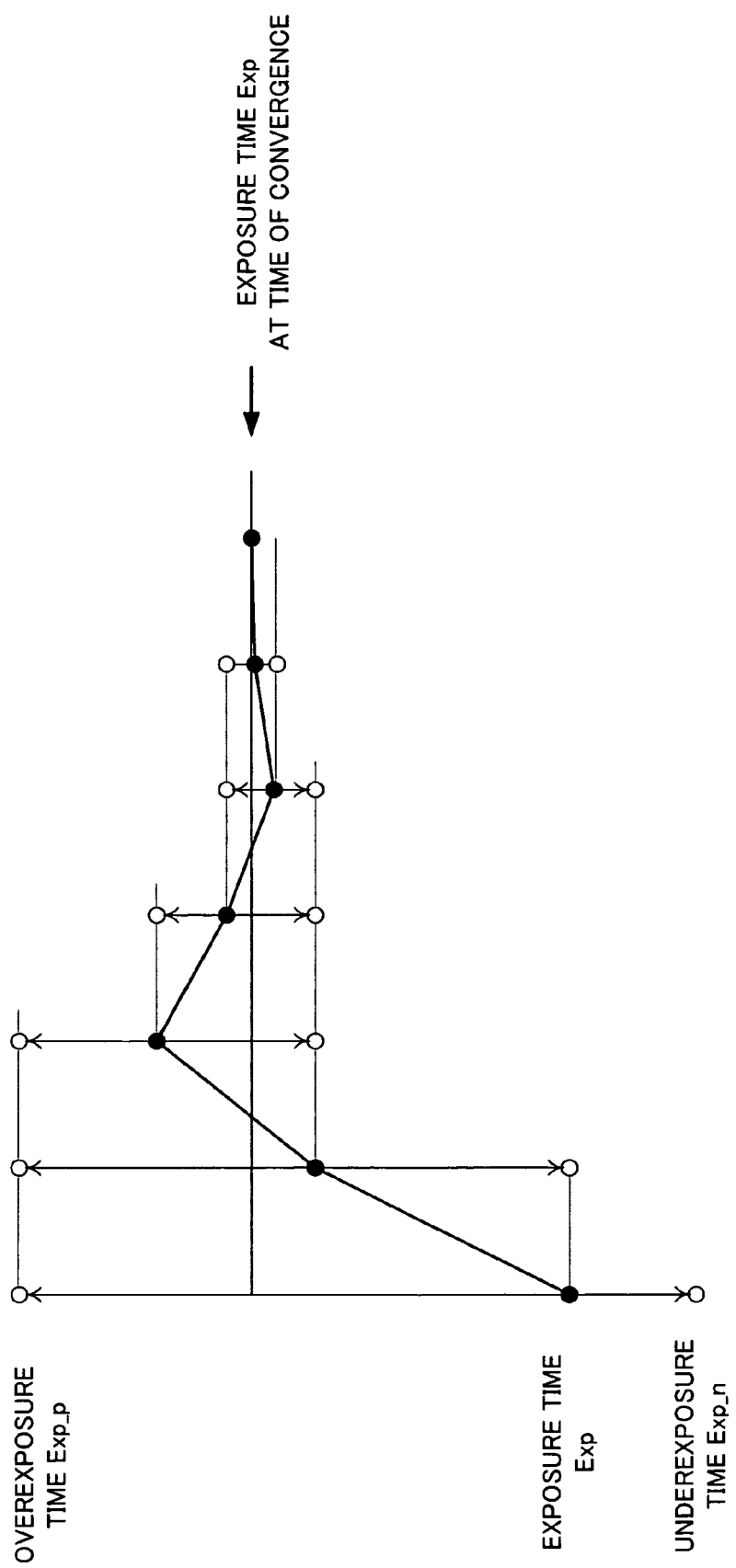
FIG. 12 is a diagram showing a state that the exposure time is converging.

Next, the description will be given of an example of a concrete process of setting the exposure time with reference to FIG. 10 to FIG. 12.

First, a process of setting the exposure time in a first example will be explained with reference to a flow chart shown in FIG. 10.

In step S11, the exposure time setting unit 50 sets an initial value of the exposure time Exp, and the process goes to step S12. In step S12, the saturation pixel detecting unit 40 obtains the digital image data Sd after the A/D conversion for one page, and detects the saturation pixels from the obtained image data Sd. Then, the process goes to step S13.

In step S13, the pixel number counter unit 41 obtains the data of the saturation pixels from the saturation pixel detecting unit 40, and counts the saturation pixel number Nmax. When the digital image data of 5 bits is generated by the A/D conversion, the pixel number counter unit 41 counts the number of pixels whose digital values are "32". When the above process ends, the process goes to step S14.

In step S14, the adder 42 compares the saturation pixel number Nmax obtained from the pixel number counter unit 41 with the target saturation pixel number Nt. Concretely, the adder 42 determines whether or not the saturation pixel number Nmax is within the prescribed range centered on the target saturation pixel number Nt. If the target saturation pixel number Nt is "100", the prescribed range is "between 80 and 120", for example.

When the saturation pixel number Nmax is within the prescribed range (step S14; Yes), the process goes out of the flow chart and ends. Namely, since the saturation pixel number Nmax is within the suitable range, the change of the magnitude value of the image signal is unnecessary at the time of the A/D conversion, and the exposure time is not changed.

On the other hand, when the saturation pixel number Nmax is not within the prescribed range (step S14; No), the process goes to step S15. In step S15, the exposure time setting unit 50 resets the exposure time Exp based on an equation (1) below.

$$Exp = Exp + (Nt - Nmax) \times G \tag{1}$$

The equation (1) expresses that the exposure time Exp is updated so that the exposure time Exp is made short if the saturation pixel number Nmax is larger than the target saturation pixel number Nt, and so that the exposure time Exp is made long if the saturation pixel number Nmax is smaller than the target saturation pixel number Nt. "G" in the equation (1) is a predetermined gain necessary for forming the stable feedback control. When the value G is large, the time until the convergence of the exposure time is shortened, but the variation amount at the steady state becomes large and unstable. Therefore, the value G is appropriately determined such that requirement of the convergence time and the stability are in harmony with each other. When the above process ends, the process goes to step S16.

In step S16, the exposure time setting unit 50 determines whether or not the exposure time Exp reset in step S15 is larger than the upper limit or smaller than the lower limit. If the exposure time is too long, the recording medium and the like may be damaged. Therefore, the upper limit is set so that the exposure time does not become too long. In addition, if the exposure time is too short, accuracy in reading the data may decrease. Therefore, the lower limit is set so that the exposure time does not become too short.

If the reset exposure time Exp is not larger than the upper limit and not smaller than the lower limit (step S16; No), the process returns to step S12, and the process is executed again with the reset exposure time Exp. On the contrary, if the reset exposure time Exp is larger than the upper limit or smaller than the lower limit (step S16; Yes), the process goes to step S17. In step S17, the exposure time setting unit 50 sets the exposure time Exp to a predetermined value H or L. The predetermined values H and L are values corresponding to the above-mentioned upper and smaller limits respectively. When the above process in step S17 ends, the process returns to step S12. Then, the process is executed again with the exposure time set to the predetermined value H or L.

In that way, by feeding back and repeatedly executing the setting process of the exposure time, the saturation pixel number Nmax becomes close to the target saturation pixel number Nt (i.e., the saturation pixel number Nmax becomes within the defined range), the change of the exposure time becomes small and the exposure time converges.

Next, the description will be given of a process of setting the exposure time according to a second example with reference to a flow chart of FIG. 11. In the second example, unlike the above-mentioned example, the exposure time is defined within the range determined by the changeable overexposure time and underexposure time, and the range set by the overexposure time and underexposure time is regulated. Thereby, the exposure time is reset.

In step S21, the exposure time setting unit 50 sets the initial values of the exposure time Exp, the overexposure time Exp_p and the underexposure time Exp_n. Each of the initial values is set so that the exposure time Exp is between the overexposure time Exp_p and the underexposure time Exp_n. When the setting of the above initial values is completed, the process goes to step S22. In step S22, the saturation pixel detecting unit 40 obtains the digital image data Sd after the A/D conversion, and the saturation pixels are detected from the obtained image data Sd. Then, the process goes to step S23. In step S23, the pixel number counter unit 41 obtains the data of the saturation pixels from the saturation pixel detecting unit 40, and counts the saturation pixel number Nmax. The process goes to step S24.

In step S24, the adder 42 determines whether or not the saturation pixel number Nmax obtained from the pixel number counter unit 41 is larger than the upper limit value within the defined range. The defined range is the range centered on the target saturation pixel number Nt. For example, when it is assumed that the target saturation pixel number Nt is "100" and the defined range is "between 80 and 120", the upper limit value of the defined range is "120".

When the saturation pixel number Nmax is larger than the upper limit value of the defined range (step S24; Yes), the process goes to step S25. In step S25, the exposure time setting unit 50 resets the exposure time Exp and the overexposure time Exp_p. In this case, since the saturation pixel number Nmax is larger than the target saturation pixel number Nt, the exposure time Exp and the overexposure time Exp_p are reset to be short. Concretely, based on equations (2) and (3) below, the exposure time Exp and the overexposure time Exp_p are reset.

$$Exp\_p = Exp \tag{2}$$

$$Exp = (Exp + Exp\_n)/2 \tag{3}$$

Namely, the reset is performed so that the overexposure time Exp_p is set to the exposure time Exp and the exposure time Exp is set to an average value (intermediate value) of the exposure time Exp and the underexposure time Exp_n before the reset. The underexposure time Exp_n is not changed. When the above-mentioned process ends, the process returns to step S22. Then, the process is performed again with the exposure time Exp and overexposure time Exp_p thus reset.

On the other hand, if the saturation pixel number Nmax is smaller than the upper limit value of the defined range (step S24; No), the process goes to step S26. In step S26, the adder 42 determines whether or not the saturation pixel number Nmax is smaller than the lower limit value of the defined range. For example, when it is assumed that the target saturation pixel number Nt is "100" and the defined range is "between 80 and 120", the lower limit value of the defined range is "80".

If the saturation pixel number Nmax is not smaller than the lower limit value of the defined range (step S26; No), the process goes out of the flow and ends. Namely, since the saturation pixel number Nmax is within the suitable range, the change of the magnitude value of the image signal before the A/D conversion is unnecessary, and the exposure time is not changed.

If the saturation pixel number Nmax is smaller than the lower limit value of the defined range (step S26; Yes), the process goes to step S27. In step S27, the exposure time setting unit 50 resets the exposure time Exp and the underexposure time Exp_n. In this case, since the saturation pixel number Nmax is smaller than the target saturation pixel number Nt, the exposure time Exp and the underexposure time Exp_n are reset to be long. Concretely, based on equations (4) and (5) below, the exposure time Exp and the underexposure time Exp_n are reset.

$$Exp\_n = Exp \tag{4}$$

$$Exp = (Exp + Exp\_p) \tag{5}$$

Namely, the reset is performed so that the underexposure time Exp_n is set to the exposure time Exp and the exposure time Exp is set to the average value (intermediate value) of the exposure time Exp and the overexposure time Exp_p before the reset. The overexposure time Exp_p is not changed. When the above-mentioned process ends, the process returns to step S22, and the process is executed again with the exposure time Exp and underexposure time Exp_n thus reset.

Now, the description will be given of FIG. 12, which shows a concrete example of a state that the exposure time Exp, the overexposure time Exp_p and the underexposure time Exp_n are changed in a case that the setting process of the exposure time according to the second example is executed. As shown in FIG. 12, the original exposure time Exp is updated to the next overexposure time Exp_p or the next underexposure time Exp_n, and the intermediate value between the updated overexposure time Exp_p and underexposure time Exp_n is set to the next exposure time Ex. By repeating such the process, the variation of the exposure time Exp remarkably becomes small and the exposure time converges.

Since the overexposure time Exp_p and the underexposure time Exp_n which define the exposure time Exp are updated in the setting process of the exposure time according to the second example, the exposure time Exp more stably changes to converge, in comparison with the setting process of the exposure time according to the first example. Therefore, the time necessary for converging the exposure time Exp can be shortened.

[Modification]

As described above, when the saturation pixel number Nmax is far from the defined range or the variation of the saturation pixel number Nmax is large, even though the gain control in the gain control unit 37 and the setting process of the exposure time by the exposure time setting unit 50 are repeatedly executed, it is preferable that an optical power of an optical power control device of the optical system included in the hologram recording and reproduction apparatus is controlled. This is because, in such the case, it is likely that the optical power itself of the reference light irradiated on the recording medium is not normal.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2004-66961 filed on Mar. 10, 2004 including the specification, claims, drawings and summary is incorporated herein by reference in its entirety.

What is claimed is:

1. A hologram reproduction apparatus capable of reproducing two-dimensionally modulated image data, comprising:
   a light-receiving unit which obtains the two-dimensionally modulated image data;
   an A/D converter which A/D-converts the image data obtained by the light-receiving unit;
   a pixel number detecting unit which detects a number of pixels having a digital value larger than a first defined value from the A/D-converted image data for a predetermined number of pixels; and
   a control unit which executes a control so that the number of pixels detected by the pixel number detecting unit is within a predetermined range,
   wherein the control unit controls an amplification factor amplifying the image data obtained by the light-receiving unit.

2. The hologram reproduction apparatus according to claim 1, wherein the first defined value is a maximum digital value.

3. A hologram reproduction apparatus capable of reproducing two-dimensionally modulated image data, comprising:
   a light-receiving unit which obtains the two-dimensionally modulated image data;
   an A/D converter which A/D-converts the image data obtained by the light-receiving unit;
   a pixel number detecting unit which detects a number of pixels having a digital value larger than a first defined value from the A/D-converted image data for a predetermined number of pixels; and
   a control unit which executes a control so that the number of pixels detected by the pixel number detecting unit is within a predetermined range,
   wherein the control unit controls an exposure time of the light-receiving unit.

4. The hologram reproduction apparatus according to claim 3, wherein the first control unit changes an overexposure time and an underexposure time which define a range of the exposure time if the number of pixels detected by the pixel number detecting unit is not within the predetermined range.

5. A hologram reproduction apparatus capable of reproducing two-dimensionally modulated image data, comprising:
   a light-receiving unit which obtains the two-dimensionally modulated image data;
   an A/D converter which A/D-converts the image data obtained by the light-receiving unit;
   a pixel number detecting unit which detects a number of pixels having a digital value larger than a first defined value from the A/D-converted image data for a predetermined number of pixels; and
   a control unit which executes a control so that the number of pixels detected by the pixel number detecting unit is within a predetermined range,
   wherein the control unit controls a conversion sensitivity of the A/D converter.

6. A hologram reproduction apparatus capable of reproducing two-dimensionally modulated image data, comprising:
   a light-receiving unit which obtains the two-dimensionally modulated image data;
   an A/D converter which A/D-converts the image data obtained by the light-receiving unit;
   a first pixel number detecting unit which detects a number of pixels having a digital value larger than a first defined value from the A/D-converted image data for a predetermined number of pixels;
   a first control unit which executes a control so that the number of pixels detected by the first pixel number detecting unit is within a predetermined range;
   a second pixel number detecting unit which detects a number of pixels having a digital value smaller than a second defined value from the A/D-converted image data for the predetermined number of pixels; and
   a second control unit which controls an offset amount of the image data at a time of the A/D conversion so that the number of pixels detected by the second pixel number detecting unit is within a predetermined range.

7. The hologram reproduction apparatus according to claim 6, wherein the second defined value is a minimum digital value.

8. The hologram reproduction apparatus according to claim 6, wherein the second control unit converts, to a minimum digital value, the image data whose value becomes negative by the control of the offset amount.

9. A hologram reproduction apparatus capable of reproducing two-dimensionally modulated image data, comprising:
   a light-receiving unit which obtains the two-dimensionally modulated image data;
   an A/D converter which A/D-converts the image data obtained by the light-receiving unit;
   a pixel number detecting unit which detects a number of pixels having a digital value larger than a first defined value from the A/D-converted image data for a predetermined number of pixels;
   a control unit which executes a control so that the number of pixels detected by the pixel number detecting unit is within a predetermined range; and
   a unit which adjusts an optical power of an optical system used at a time of the reproduction, when the number of pixels detected by the first pixel number detecting unit does not satisfy a predetermined condition at a time of the control repeatedly executed by the control unit.

10. A hologram reproduction method capable of reproducing two-dimensionally modulated image data, comprising:
    a light-receiving process which obtains the two-dimensionally modulated image data;
    an A/D converting process which A/D-converts the image data obtained in the light-receiving process;
    a pixel number detecting process which detects a number of pixels having a digital value larger than a defined value from the A/D-converted image data for a predetermined number of pixels; and
    a control process which executes control so that the number of pixels detected by the pixel number detecting process is within a predetermined range,
    wherein the control process controls an amplification factor amplifying the image data obtained by the light-receiving process.

11. A hologram reproduction method capable of reproducing two-dimensionally modulated image data, comprising:
    a light-receiving process which obtains the two-dimensionally modulated image data;
    an A/D converting process which A/D-converts the image data obtained in the light-receiving process;
    a pixel number detecting process which detects a number of pixels having a digital value larger than a defined value from the A/D-converted image data for a predetermined number of pixels; and
    a control process which executes control so that the number of pixels detected by the pixel number detecting process is within a predetermined range,
    wherein the control process controls an exposure time of the light-receiving process.

12. A hologram reproduction method capable of reproducing two-dimensionally modulated image data, comprising:
    a light-receiving process which obtains the two-dimensionally modulated image data;
    an A/D converting process which A/D-converts the image data obtained in the light-receiving process;
    a pixel number detecting process which detects a number of pixels having a digital value larger than a defined value from the A/D-converted image data for a predetermined number of pixels; and
    a control process which executes control so that the number of pixels detected by the pixel number detecting process is within a predetermined range,
    wherein the control process controls a conversion sensitivity of the A/D converting process.

13. A hologram reproduction method capable of reproducing two-dimensionally modulated image data, comprising:
    a light-receiving process which obtains the two-dimensionally modulated image data;
    an A/D converting process which A/D-converts the image data obtained in the light-receiving process;
    a first pixel number detecting process which detects a number of pixels having a digital value larger than a defined value from the A/D-converted image data for a predetermined number of pixels;
    a first control process which executes control so that the number of pixels detected by the first pixel number detecting process is within a predetermined range;
    a second pixel number detecting process which detects a number of pixels having a digital value smaller than a second defined value from the A/D-converted image data for the predetermined number of pixels; and
    a second control process which controls an offset amount of the image data at a time of the A/D conversion so that the number of pixels detected by the second pixel number detecting process is within a predetermined range.

14. A hologram reproduction method capable of reproducing two-dimensionally modulated image data, comprising:
    a light-receiving process which obtains the two-dimensionally modulated image data;
    an A/D converting process which A/D-converts the image data obtained in the light-receiving process;
    a pixel number detecting process which detects a number of pixels having a digital value larger than a defined value from the A/D-converted image data for a predetermined number of pixels;
    a control process which executes control so that the number of pixels detected by the pixel number detecting process is within a predetermined range; and
    a process which adjusts an optical power of an optical system used at a time of the reproduction, when the number of pixels detected by the pixel number detecting process does not satisfy a predetermined condition at a time of the control repeatedly executed by the control process.

* * * * *